(12) United States Patent
Lee et al.

(10) Patent No.: US 11,627,134 B1
(45) Date of Patent: Apr. 11, 2023

(54) CANCELLATION AND REVERSION OF UNAUTHORIZED OPERATIONS

(71) Applicant: Amazon Technologies, Inc., Seattle, WA (US)

(72) Inventors: Robert E. Lee, Bellevue, WA (US); Harnil C. Rafalia, Issaquah, WA (US); Bradley Vivian Quadros, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 487 days.

(21) Appl. No.: 16/569,063

(22) Filed: Sep. 12, 2019

(51) Int. Cl.
*H04L 9/40* (2022.01)
*G06Q 20/40* (2012.01)
*G06F 9/451* (2018.01)

(52) U.S. Cl.
CPC .............. *H04L 63/10* (2013.01); *G06F 9/451* (2018.02); *G06Q 20/4016* (2013.01); *H04L 63/08* (2013.01); *H04L 63/18* (2013.01); *H04L 63/20* (2013.01); *H04L 63/1458* (2013.01)

(58) Field of Classification Search
CPC ......... H04L 63/10; H04L 63/08; H04L 63/18; H04L 63/20; H04L 63/1458; G06F 9/451; G06Q 20/4016
See application file for complete search history.

(56) References Cited

U.S. PATENT DOCUMENTS

| | | | | |
|---|---|---|---|---|
| 7,426,492 B1 * | 9/2008 | Bishop | ................... | G06Q 20/02 705/38 |
| 8,412,155 B2 * | 4/2013 | McCanna | ............ | G06Q 20/405 455/407 |
| 8,505,102 B1 * | 8/2013 | Cannings | .............. | H04L 63/145 726/24 |
| 8,769,304 B2 * | 7/2014 | Kirsch | ............... | G06Q 20/0855 713/189 |
| 9,754,256 B2 * | 9/2017 | Britton | ............... | G06Q 10/0635 |
| 11,139,955 B1 * | 10/2021 | So | ....................... | G06Q 20/3674 |
| 11,151,568 B2 * | 10/2021 | Bermudez-Cisneros | .................... | G06Q 20/401 |
| 11,282,139 B1 * | 3/2022 | Winklevoss | ........... | G06Q 40/04 |
| 2005/0097320 A1 * | 5/2005 | Golan | .................... | G06F 21/40 713/166 |
| 2008/0021803 A1 * | 1/2008 | Ahles | ................... | G06Q 20/042 705/35 |

(Continued)

OTHER PUBLICATIONS

Search Query Report from IP.com (performed Nov. 18, 2021) (Year: 2021).*

(Continued)

*Primary Examiner* — Sharon S Lynch (74) *Attorney, Agent, or Firm* — Thomas Horstemeyer, LLP (57) ABSTRACT

Disclosed are various embodiments for facilitating the cancellation or reversion of unauthorized operations. An operation initiated to be executed with respect to a user account is received from a computing device that has been authenticated. A notification of the operation is sent through at least one communication channel in response to receiving the operation. The notification facilitates a reply that causes the operation to be cancelled when the reply is sent within a first time period and causes the operation to be reverted when the reply is sent within a second time period after an expiration of the first time period.

20 Claims, 8 Drawing Sheets

(56) References Cited

U.S. PATENT DOCUMENTS

| | | | |
|---|---|---|---|
| 2009/0048968 A1* | 2/2009 | Bishop | G06Q 40/00 705/39 |
| 2009/0048969 A1* | 2/2009 | Bishop | G06Q 20/10 705/39 |
| 2009/0076956 A1* | 3/2009 | Bishop | G06Q 40/00 705/40 |
| 2009/0076957 A1* | 3/2009 | Bishop | G06Q 20/102 705/40 |
| 2009/0076958 A1* | 3/2009 | Bishop | G06Q 20/10 705/41 |
| 2009/0083181 A1* | 3/2009 | Bishop | G06Q 40/025 705/41 |
| 2009/0125426 A1* | 5/2009 | Bishop | G06Q 40/00 705/34 |
| 2009/0138388 A1* | 5/2009 | Bishop | G06Q 40/12 705/30 |
| 2009/0150269 A1* | 6/2009 | Bishop | G06Q 40/12 705/30 |
| 2009/0150270 A1* | 6/2009 | Bishop | G06Q 20/10 705/30 |
| 2009/0150271 A1* | 6/2009 | Bishop | G06Q 20/102 705/30 |
| 2009/0150288 A1* | 6/2009 | Bishop | G06Q 40/00 705/44 |
| 2010/0161399 A1* | 6/2010 | Posner | G06Q 30/02 705/14.13 |
| 2011/0004498 A1* | 1/2011 | Readshaw | G06Q 20/40 705/318 |
| 2012/0096557 A1* | 4/2012 | Britton | G06Q 20/4016 726/25 |
| 2012/0157042 A1* | 6/2012 | McCanna | G06Q 20/405 455/407 |
| 2012/0323717 A1* | 12/2012 | Kirsch | G06F 21/31 705/26.1 |
| 2012/0323786 A1* | 12/2012 | Kirsch | G06Q 20/0855 705/44 |
| 2012/0324242 A1* | 12/2012 | Kirsch | G06F 21/6245 713/189 |
| 2014/0358789 A1* | 12/2014 | Boding | G06Q 20/405 705/44 |
| 2015/0019654 A1* | 1/2015 | Wheeler | H04L 51/224 709/206 |
| 2015/0088754 A1* | 3/2015 | Kirsch | G06Q 20/12 705/71 |
| 2016/0012465 A1* | 1/2016 | Sharp | G06Q 20/386 705/14.17 |
| 2016/0328710 A1* | 11/2016 | Britton | G06Q 20/40 |
| 2017/0329615 A1* | 11/2017 | Kahn | G06Q 20/108 |
| 2018/0121915 A1* | 5/2018 | Britton | G06Q 10/0635 |
| 2018/0174143 A1* | 6/2018 | Bastide | G06Q 20/405 |
| 2018/0240107 A1* | 8/2018 | Andrade | G06Q 20/36 |
| 2019/0347666 A1* | 11/2019 | Bermudez-Cisneros | G06Q 20/401 |
| 2020/0195437 A1* | 6/2020 | Gallagher | H04L 9/0637 |
| 2022/0027919 A1* | 1/2022 | Bermudez-Cisneros | G06F 21/31 |

OTHER PUBLICATIONS

Search Query Report from IP.com (performed Jul. 26, 2022) (Year: 2022).*

Search Query Report from IP.com (performed Nov. 17, 2022) (Year: 2022).*

* cited by examiner

CANCELLATION AND REVERSION OF UNAUTHORIZED OPERATIONS

BACKGROUND

In the most straightforward scenario, a malicious actor may gain access to a user's account on a computing service by obtaining the account username and password. In some cases, the malicious actor may gain read access to a channel of communication associated with the account, such as a telephone number, an email address, etc., so that the malicious actor is able to reset the account password without knowing it. Once the malicious actor has access to the account, the malicious actor may change the email address or other channels of communication associated with the account, change the account password, and/or perform other unauthorized operations.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to the cancellation and/or reversion of unauthorized operations through the use of a time delay in executing the operations. When malicious actors gain access to an account, the malicious actors will often perform operations directed at limiting the access of the legitimate user, exploiting the resources of the user account, placing fraudulent orders for delivery to physical or virtual addresses not configured by the legitimate user, adjusting financial information in order for the malicious actors to receive payments associated with the account, posting fraudulent customer reviews, engaging in fraudulent buyer/seller activities, and/or other operations. Damage occurs in terms of fraudulent activity, including delivery of goods and/or services not initiated by the legitimate user and transfers of monies or money equivalents, unauthorized access to or exfiltration of private data, unauthorized account configuration changes, and so forth.

Various embodiments of the present disclosure introduce approaches to limit the damage of unauthorized account usage by enabling the cancellation and/or reversion of unauthorized operations. When an operation such as a change of a communication channel that would affect future authentication is requested, the operation is delayed for a first time period. Responsive to the operation, notification of the pending operation can be sent to the existing communication channels associated with the account. The notification may include a component that enables the user to flag the operation as being unauthorized, upon which the operation may be cancelled if within the first time period, or reverted if within a second time period following the first period. The user may then be provided with information about how a malicious actor initially gained access to the user's account, and the account security credentials may be reset.

As one skilled in the art will appreciate in light of this disclosure, certain embodiments may be capable of achieving certain advantages, including some or all of the following: (1) improving security of computer systems and networks by allowing for faster detection of account or hardware compromises and/or blocking the effects of those compromises before they occur, (2) reducing malicious network traffic, such as denial-of-service attacks and attacks launched from compromised accounts by limiting unauthorized access to compromised accounts, (3) improving security of computer systems and networks operated by different entities where rapid detection of a compromise of a first account on a first system or network may enable the detection of a compromised second account on a second system or network, (4) reducing computing resources (e.g., processor, memory, data storage, and network traffic) associated with correcting the effects of continued unauthorized usage of an account; and so forth.

Figure 1:
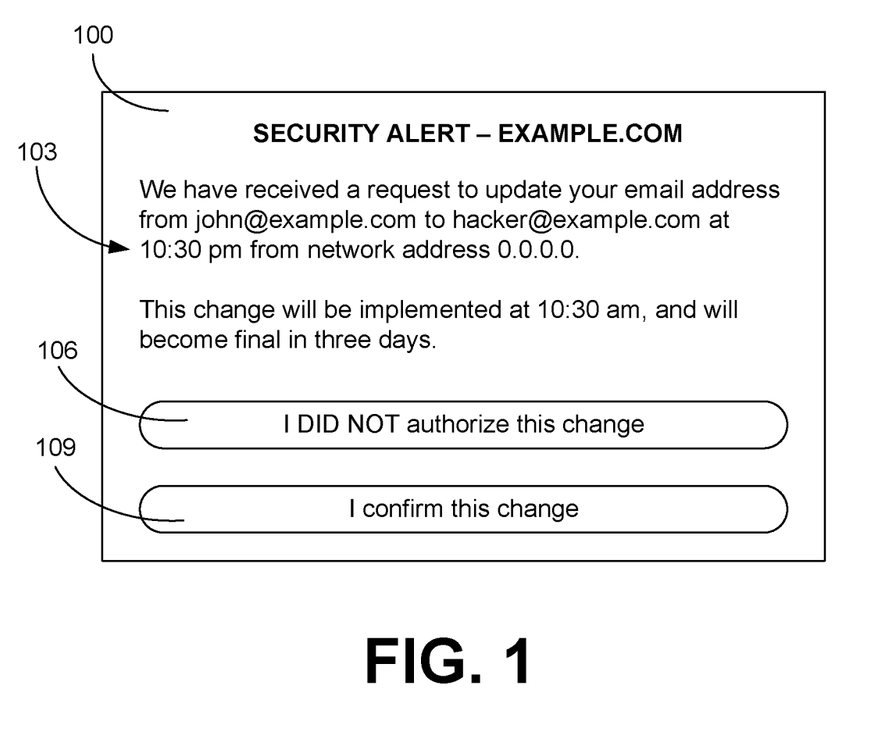
FIG. 1 is a drawing of an example user interface according to various embodiments of the present disclosure.

Turning now to FIG. 1, shown is one example of a user interface 100 according to various embodiments. The user interface 100 corresponds to a notification of an operation sent through a communication channel associated with a user account. At component 103, the user interface 100 informs the user that a request has been received to change an email address associated with the user account to a different email address. This account change, if initiated by an unauthorized user, may have the result of locking the legitimate user out of the account by preventing account recovery through the previously configured email address. As such, the change may affect future authentication for the user account.

The user interface 100 in this example includes a component 106 that when selected causes the operation of changing the email address either to be cancelled or reverted. In addition, the user interface 100 in this example includes a component 109 that when selected causes the operation of changing the email address to be executed without further delay. The components 106, 109 as shown correspond to buttons but may be links, checkboxes, and/or other types of user interface components in other examples.

In other examples, the user interface 100 may include explanatory text or a component to activate a help feature which would explain that confirming that the change is unauthorized will result in securing the account, potentially ending the legitimate user's session, and necessitating actions by the legitimate user to update security credentials and regain access. The user interface 100 may also be updated to present information about how the user initiating the unauthorized operation gained access to the account. In the following discussion, a general description of the system and its components is provided, followed by a discussion of the operation of the same.

Figure 2:
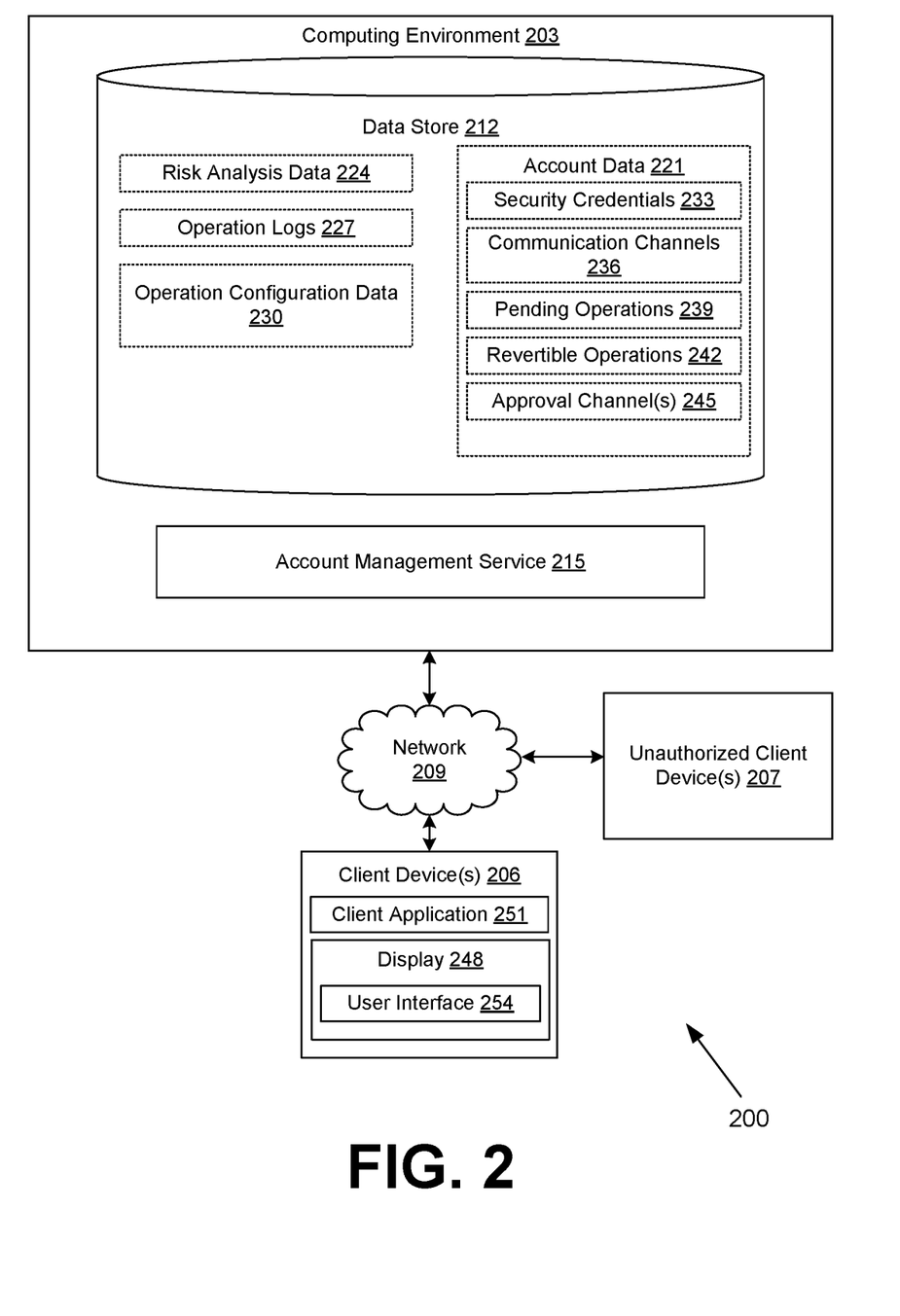
FIG. 2 is a schematic block diagram of a networked environment according to various embodiments of the present disclosure.

With reference to FIG. 2, shown is a networked environment 200 according to various embodiments. The networked environment 200 includes a computing environment 203, one or more client devices 206, and one or more unauthorized client devices 207, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an account management service 215 and other applications, services, processes, systems, engines, or functionality not discussed in detail herein. The account management service 215 is executed to authenticate users for access to user accounts and facilitate management of the user accounts. The user accounts may correspond to accounts with an electronic commerce system, a computing service provider, a social network, an email provider, an information network site, and/or any other computing system that offers user accounts. In some implementations, the account management service 215 operates as part of a federated identity provider, where the user accounts may be used to sign-in to disparate sites or services that use the federated identity provider.

As part of managing the user accounts, the account management service 215 may allow users to perform operations through the user account. Some operations may include changes that will affect future authentication or accessibility of the account. For example, users may change security credentials, update channels of communication, change delivery addresses, and so forth. The account management service 215 is configured to send notifications of the operations via previously configured channels of communication. The account management service 215 can then cancel or revert the operations if a user replies to the notification requesting the cancellation or reversion of the operations.

The data stored in the data store 212 includes, for example, account data 221, risk analysis data 224, operation logs 227, operation configuration data 230, and potentially other data. The account data 221 corresponds to various information associated with user accounts. The account data 221 may include, for example, one or more security credentials 233, one or more communication channels 236, pending operations 239, revertible operations 242, information identifying potentially one or more approval channels 245, and/or other data.

The security credentials 233 are used to authenticate users at client devices 206 for access to user accounts. To this end, the security credentials 233 may include passwords, one-time passwords, registration tokens, personal identification numbers, data relating to public key cryptography, answers to knowledge-based questions, and/or other types of credentials.

The communication channels 236 identify previously configured channels of communication that can be used to manage or take control of the user account. The communication channels 236 may be of generally limited access so only the user(s) associated with the user account will be able to receive information sent via the communication channels 236. The communication channels 236 can include email addresses and phone numbers. In some implementations, the communication channels 236 may include first-party devices and/or first-party applications that are registered to the user account such that the account management service 215 can send notifications through the communication channels 236 in a secure way.

The pending operations 239 correspond to those operations that have been initiated through a user account but have not yet been executed because a first time period has not yet completed. The pending operations 239 are subject to potential cancellation by the user if the user responds within the first time period that the pending operations 239 were unauthorized.

The revertible operations 242 correspond to those operations that have been initiated through a user account and have been executed. Thus, once the first time period expires, the pending operations 239 become executed but revertible operations 242. However, a second time period following the execution of the operations has not yet expired. Consequently, the revertible operations 242 are capable of being reverted by the user if the user responds within the second time period that the revertible operations 242 were unauthorized.

The approval channels 245 correspond to one or more client devices 206 or channels of communication that are registered to the user account and specifically designated by the user for receiving and responding to approval requests. Eligible approval channels are capable of providing a high level of authentication assurance and are very unlikely to be controlled by unauthorized users. For example, the approval channels 245 may correspond to first-party devices or applications that the user is likely to maintain under his or her possession or control. The approval channels 245 may employ secure storage elements that make extracting cryptographic key material difficult. The approval channels 245 may also employ local biometric challenges to manage access. Because of the relatively high level of authentication assurance, a user responding from an approval channel 245 can be permitted to approve pending operations 239 and revertible operations 242 such that they are executed without further delay. As such, it is important to make sure that unauthorized users are unable to confirm their operations by way of the approval channels 245.

The risk analysis data 224 corresponds to data from a risk analysis performed with respect to a proposed operation initiated by a user for a user account. The risk analysis data 224 may be generated by a risk management system based at least in part on information about the initiated operation and/or the client device 206 or 207. For example, if the proposed operation has an effect on authentication that could result in the locking out of the user, the operation could be considered to have a higher authentication assurance requirement than a proposed operation that simply updates a user's name. As another example, if the proposed operation originates from a client in a geographic area not previously associated with the user account, or from a client having identifying characteristics never before seen, the operation could be deemed to have a higher risk score. The risk analysis data 224 can be used as a factor in determining the length of the first time period in which the operation remains unexecuted and in a pending status.

The operation logs 227 include data describing operations that are initiated, including information as to how the operations were initiated and about the client device 206 or unauthorized client device 207 that initiated the operation. For example, the operation logs 227 may indicate the network address, device identifier, click trails, user agent, geographic location, and/or other data associated with the request to perform an operation. The operation logs 227 may also document a sequence of steps associated with the operation such that the account operation can be revertible after it is executed.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display 248. The display 248 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 251 and/or other applications. The client application 251 may be executed in a client device 206, for example, to access network content served up by the computing environment 203 and/or other servers, thereby rendering a user interface 254 on the display 248. To this end, the client application 251 may comprise, for example, a browser, a dedicated application, etc., and the user interface 254 may comprise a network page, an application screen, etc. The client device 206 may be configured to execute applications beyond the client application 251 such as, for example, email applications, social networking applications, word processors, spreadsheets, and/or other applications.

The unauthorized client device 207 corresponds to a processor-based system such as a client device 206 or a server computing device that is operated by an unauthorized or malicious user to gain access to a user account. The operations of the unauthorized client device 207 may be manually or automatically directed.

Figure 3:
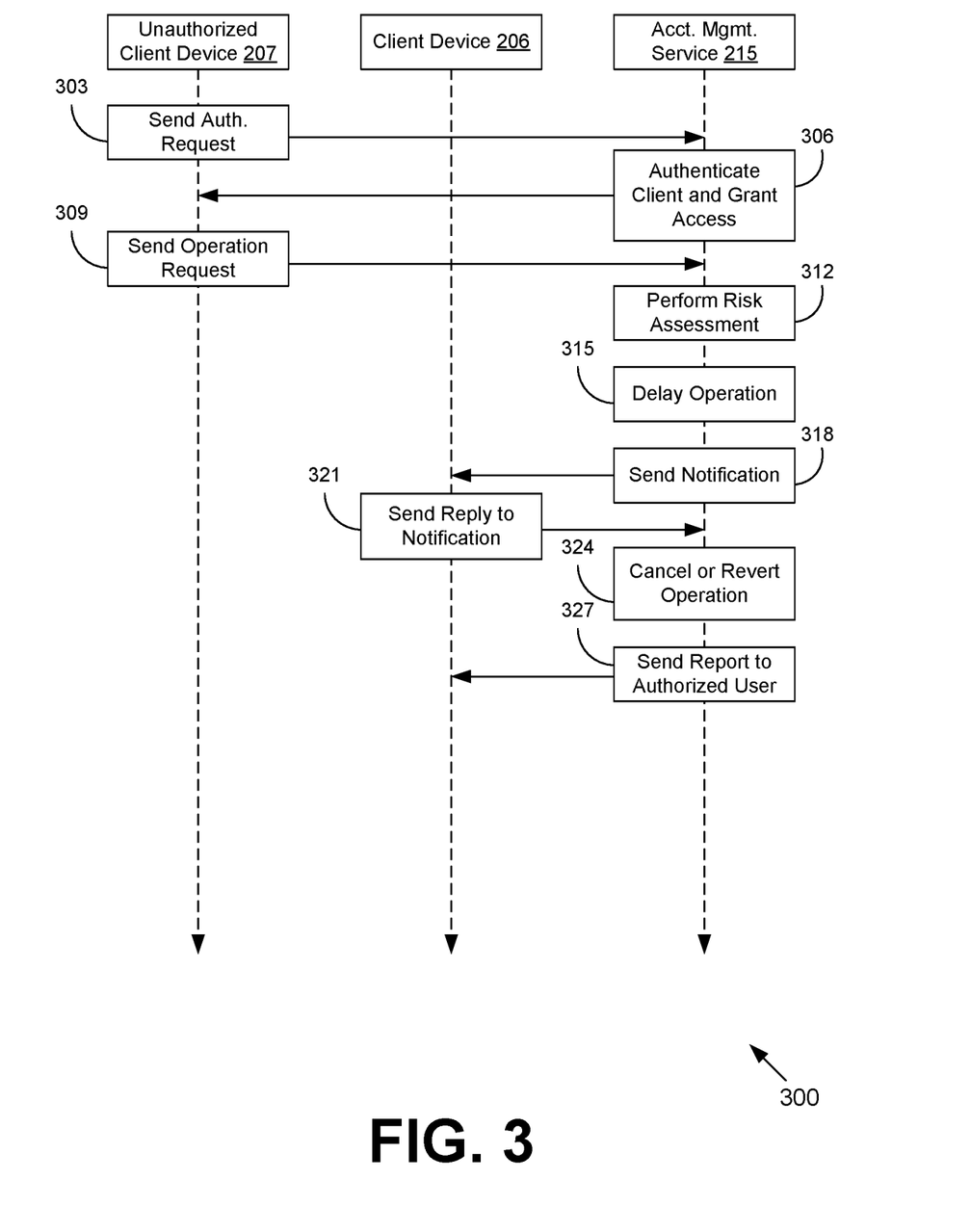
FIG. 3 is a sequence diagram illustrating one example of interactions among components in the networked environment of FIG. 2 according to various embodiments of the present disclosure.

Moving on to FIG. 3, shown is a sequence diagram 300 that provides one example of the interactions between the unauthorized client device 207, the client device 206, and the account management service 215 according to various embodiments. It is understood that the sequence diagram 300 provides merely an example of the many different types of functional arrangements that may be employed to implement the operation of the depicted portions of the unauthorized client device 207, the client device 206, and the account management service 215 as described herein. As an alternative, the sequence diagram 300 may be viewed as depicting an example of elements of a method implemented in the computing environment 203 (FIG. 2) according to one or more embodiments.

Beginning with box 303, the unauthorized client device 207 sends an authentication request to the account management service 215 via the network 209 (FIG. 2). For example, the unauthorized client device 207 may sign-in through a network site or an application programming interface (API) with a username for the user account and a password or other security credential 233 (FIG. 2) that has been compromised. Alternatively, the unauthorized client device 207 may gain unauthorized access to a communication channel 236 (FIG. 2) associated with the user account and obtain a security credential 233 such as a one-time password via an account recovery request.

In box 306, the account management service 215 authenticates the unauthorized client device 207 by verifying the security credential 233. The account management service 215 then grants access to the unauthorized client device 207 to resources associated with the user account. The account management service 215 may return an authentication token to the unauthorized client device 207 by way of the network 209.

In box 309, the unauthorized client device 207 in an authenticated state sends a request to perform an operation with respect to the user account to the account management service 215. The operation may be a change to the account that will affect future authentication, such as to lock the legitimate user out of the account, by changing the communication channels 236 and/or the security credentials 233. Other operations may include changing a shipping address, placing an order for physical goods, services, and/or digital downloads, and so forth.

In box 312, the account management service 215 performs a risk assessment with respect to the initiated operation. In other words, the account management service 215 can determine a potential risk of a compromise being associated with the operation. For example, there may be a potential risk of compromise if the operation is initiated by a client that has not been used before to access the user account, if the client is in a different geographic area than clients previously used to access the user account, if the session of the client appears to reflect automated activity or another pattern of activity not historically associated with the user account, and so on. The account management service 215 can also determine the value of the operation. For example, an operation that could lock the user out of accessing the user account, an operation that has an irrevertible impact, or an operation that has a large financial impact, may be judged to have a greater value, and thus have a higher authentication assurance requirement, than other operations.

In box 315, the account management service 215 delays the execution of the initiated operation for a first time period that is based at least in part on the risk assessment. In box 318, the account management service 215 sends a notification of the initiated operation to one or more communication channels 236 that are associated with the user account. The notification facilitates a reply that indicates that the proposed operation has not been initiated by them, thereby indicating unauthorized activity.

In box 321, the client device 206 associated with the legitimate user receives the notification via at least one of the one or more communication channels 236, and the legitimate user sends a reply indicating that the operation was not initiated by the legitimate user, or is unauthorized by the legitimate user. The reply is sent to the account management service 215 via the network 209.

In box 324, the account management service 215 cancels the initiated operation if the reply is received within the first time period before the operation is executed, or reverts the initiated operation if the reply is received in a second time period following the first time period. In box 327, the account management service 215 may send a report to the authorized user indicating detailed information regarding the unauthorized use. This allows the authorized user to make changes to the user account or other activity to address the issue that led to the compromise. Thereafter, the sequence diagram 300 ends.

Referring next to FIGS. 4A-4D, shown are flowcharts that provide examples of the operation of portions of the account management service 215 according to various embodiments. It is understood that the flowcharts of FIGS. 4A-4D provide merely an example of the many different types of functional arrangements that may be employed to implement the operation of the portions of the account management service 215 as described herein. As an alternative, the flowcharts of FIGS. 4A-4D may be viewed as depicting an example of elements of a method implemented in the computing environment 203 (FIG. 2) according to one or more embodiments.

Figure 4A:
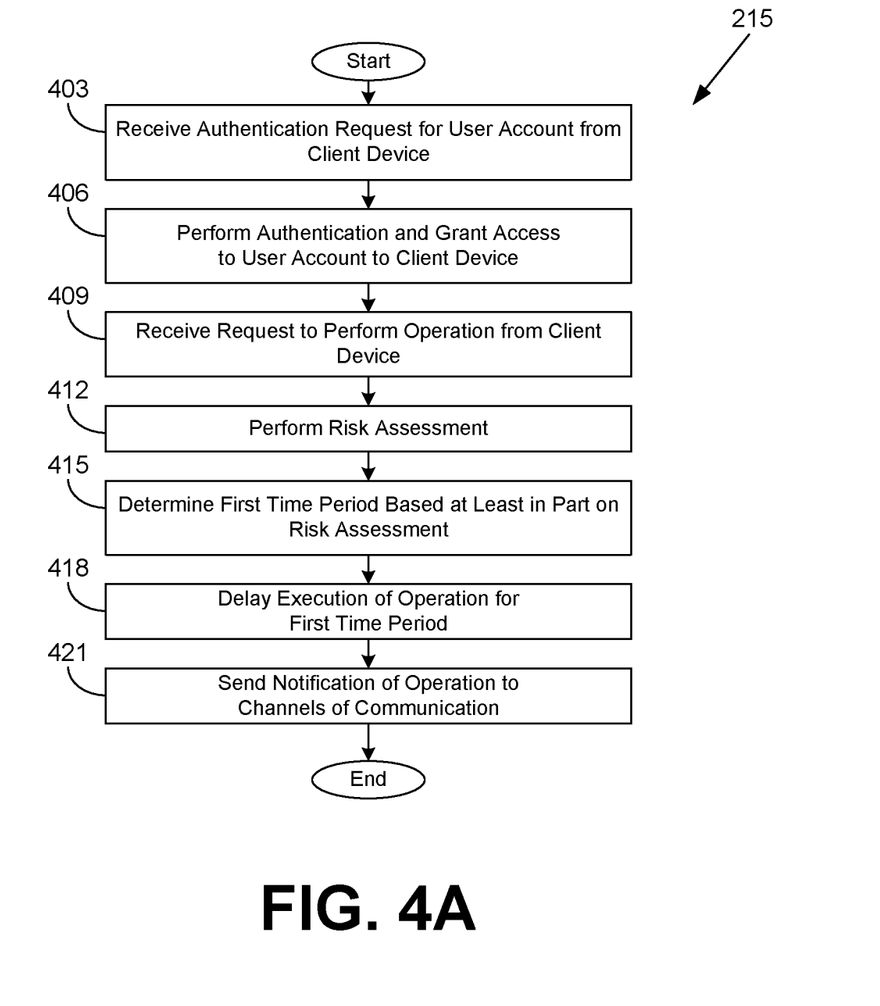
FIGS. 4A-4D are flowcharts illustrating examples of functionality implemented as portions of an account management service executed in a computing environment in the networked environment of FIG. 2 according to various embodiments of the present disclosure.

Turning now to FIG. 4A, in box 403, the account management service 215 receives an authentication request for a user account from a client device 206 (FIG. 2). The client device 206 may be an unauthorized client device 207 (FIG. 2), but the account management service 215 may not be able to distinguish the unauthorized client device 207 from a client device 206 that is controlled by a legitimate user. For example, the client device 206 may sign-in through a network site or an application programming interface (API) with a username for the user account and a password or other security credential 233 (FIG. 2) that has been compromised. Alternatively, the client device 206 may gain unauthorized access to a communication channel 236 (FIG. 2) associated with the user account and obtain a security credential 233 such as a one-time password via an account recovery request.

In box 406, the account management service 215 performs the authentication and grants the client device 206 access to the user account. The account management service 215 may return an authentication token to the client device 206 by way of the network 209 (FIG. 2). In box 409, the account management service 215 receives a request to perform an operation from the client device 206 that has been authenticated. The operation may be a change to the account that will affect future authentication, such as to lock the legitimate user out of the account, by changing the communication channels 236 and/or the security credentials 233. Other operations may include changing a shipping address, altering how payments are received, placing an order for physical goods, services, and/or digital downloads, and so forth.

In box 412, the account management service 215 performs a risk assessment with respect to the proposed operation and the client device 206. In other words, the account management service 215 can determine a potential risk of a compromise being associated with the operation. For example, there may be a potential risk of compromise if the operation is initiated by a client that has not been used before to access the user account, if the client is in a different geographic area than clients previously used to access the user account, if the session of the client appears to reflect automated activity or another pattern of activity not historically associated with the user account, and so on. The account management service 215 can also determine the value of an operation. For example, an operation that could lock the user out of accessing the user account, an operation that has an irreversible impact, or an operation that has a large financial impact, may be judged to have a higher value, and thus have a higher authentication assurance requirement, than other operations.

Also, the risk assessment may be based at least in part on the authentication assurance level associated with the client device 206. For example, the authentication assurance level may be considered relatively low if a user has supplied only a password, but the authentication assurance level may be considered relatively high if the user has supplied the password, entered a one-time password sent to via short message service (SMS) to a mobile number on file, and correctly answered a knowledge-based question. Lower levels of authentication assurance may be associated with a higher likelihood of compromise, while higher levels of authentication assurance may be associated with a lower likelihood of compromise. The account management service 215 may obtain the risk assessment from the risk analysis data 224 (FIG. 2) if the risk assessment is performed by another entity.

In box 415, the account management service 215 determines a first time period based at least in part on the risk assessment. For example, an operation with a low risk score may have a shorter first time period, while an operation with a higher risk score may result in a longer first time period. Alternatively, the length of the first time period may be a predefined value in the operation configuration data 230 (FIG. 2). As non-limiting examples, the first time period may be four hours, twelve hours, twenty-four hours, or some other time period in which it would be acceptable to delay the execution of the operation. In box 418, the account management service 215 delays the execution of the initiated operation for the first time period.

In box 421, the account management service 215 sends a notification of the proposed operation to the communication channels 236 associated with the user account. The notification is sent in response to receiving the initiated operation and placing it into the pending state in the first time period. The notification informs the user of the proposed operation and gives the user an opportunity to indicate if the operation was not authorized. Further, in some implementations, the notification may give the user an opportunity to confirm or approve the operation so that it is executed immediately rather than to wait out the remaining duration of the first time period. In some cases, an unauthorized actor may also receive the notification, but the notification may be sent to all communication channels 236, and the unauthorized actor may be unlikely to be in control of all the communication channels 236. In some cases, the notification may be sent to all communication channels 236 except those communication channels 236 that are known to be compromised.

In a first example, the notification may comprise a text message sent to a telephone number associated with the user account, and the reply may be by way of accessing a link in the text message or replying to the sender the text message with a return text message. In a second example, the notification may comprise an email message sent to an email address associated with the user account, and the reply may be by way of accessing a link in the email message or replying to the sender of the email message with a return email message. In a third example, a communication channel 236 is a client device 206 registered to the user account, and the notification may comprise a graphical user interface 254 (FIG. 2), and the notification facilitates the reply by a selectable graphical component in the user interface 254. In a fourth example, a communication channel 236 is a voice interface client device 206 registered to the user account, the notification may comprise a synthesized voice message, and the notification facilitates the reply by receiving a voice reply to the synthesized voice message. In a fifth example, the notification may comprise a telephone call to a telephone number associated with a user account, and the reply may be by way of a voice reply or a dual-tone, multi-frequency (DTMF) tone.

It is noted that a given user account may be shared by multiple users, including adult users and potentially child users. The notification may include enough identifying information to allow one user to confirm that another user that originated the operation request is an authorized user. In some cases, the unauthorized operation may be a mistaken operation by an authorized user, or in the case of a child under parental controls, the unauthorized operation may be an operation initiated by a child user that is not authorized by the adult user. Thereafter, the operation of the portion of account management service 215 ends.

Figure 4B:
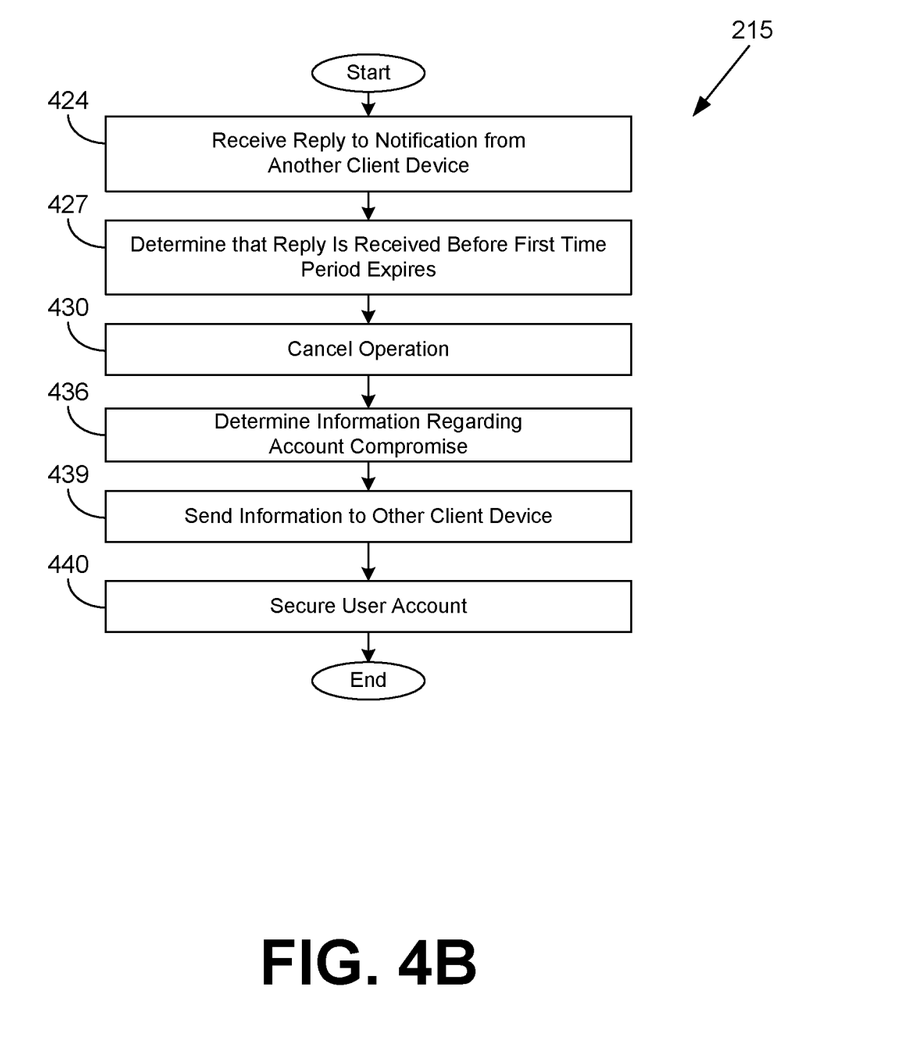

Continuing to FIG. 4B, in box 424, the account management service 215 receives a reply to the notification from another client device 206, where the reply indicates that the operation was unauthorized. In box 427, the account management service 215 determines that the reply is received before the first time period has expired. In box 430, the account management service 215 cancels the pending operation 239 (FIG. 2). In box 436, the account management service 215 determines information in regard to the account compromise. This may involve determining information about the client device 206 that was used to request the operation and/or information about the communication channels 236 that are compromised. For instance, the user's email password may have been compromised, and access to the user's email account may have enabled access to the user account in question. In box 439, the account management service 215 sends the information as a report to the other client device 206. For example, the report may be sent to via a notification to an internal secure inbox of a first-party application or first-party device. In box 440, the account management service 215 may secure the user account, which may involve changing the security credentials 233 or the communication channels 236 that have been compromised. As a consequence, the session of the legitimate user may be ended, and the legitimate user may have to perform various actions to regain access to the account, such as performing security credential resets. Thereafter, the operation of the portion of the account management service 215 ends.

Figure 4C:
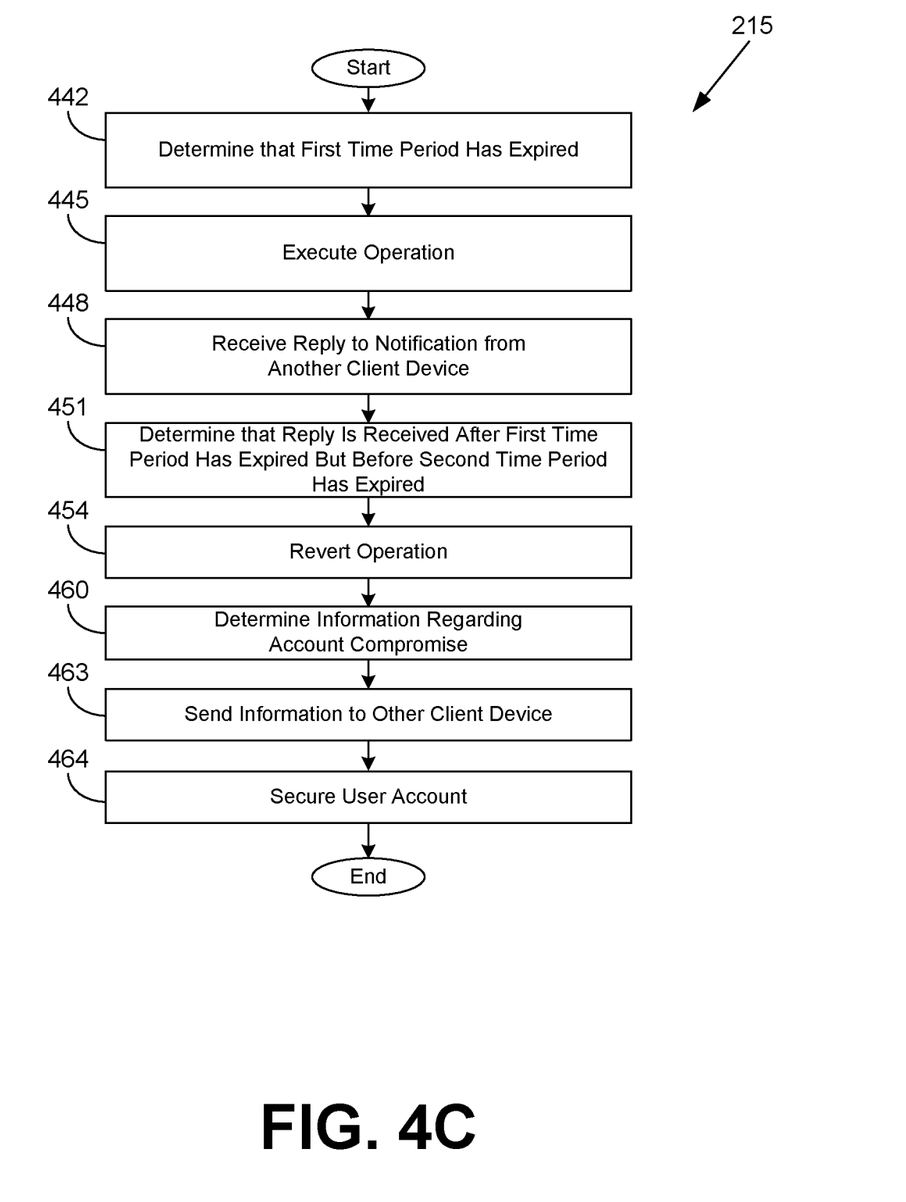

Referring next to FIG. 4C, in box 442, the account management service 215 determines that the first time period has expired. In box 445, the account management service 215 executes the initiated operation. In box 448, the account management service 215 receives a reply to the notification from another client device 206, where the reply indicates that the operation was unauthorized. In box 451, the account management service 215 determines that the reply is received after the first time period has expired but before a second time period following the first time period has expired. The second time period may be dynamically determined or predetermined in the account operation configuration data 230. As non-limiting examples, the second time period may be one day, two days, three days, a week, or some other time period.

In box 454, the account management service 215 reverts the revertible operation 242 (FIG. 2). In doing so, the account management service 215 may refer to the account operation logs 227 (FIG. 2) and programmatically revert the executed operation.

In box 460, the account management service 215 determines information in regard to the account compromise. This may involve determining information about the client device 206 that was used to request the operation and/or information about a communication channel 236 that is compromised. For instance, the user's email password may have been compromised, and access to the user's email account may have enabled access to the user account in question. In box 463, the account management service 215 sends the information as a report to the other client device 206. For example, the report may be sent to via a notification to an internal secure inbox of a first-party application or first-party device. In box 464, the account management service 215 may secure the user account, which may involve changing the security credentials 233 or the communication channels 236 that have been compromised. As a consequence, the session of the legitimate user may be ended, and the legitimate user may have to perform various actions to regain access to the account, such as performing security credential resets. Thereafter, the operation of the portion of the account management service 215 ends.

In other examples where a reply to the notification is received after the expiration of the second time period, the account management service 215 may choose not to act upon the reply to the notification. In some cases, the account management service 215 may flag the user account for manual security review or take an automated step to secure the user account in response to receiving the delayed reply.

Figure 4D:
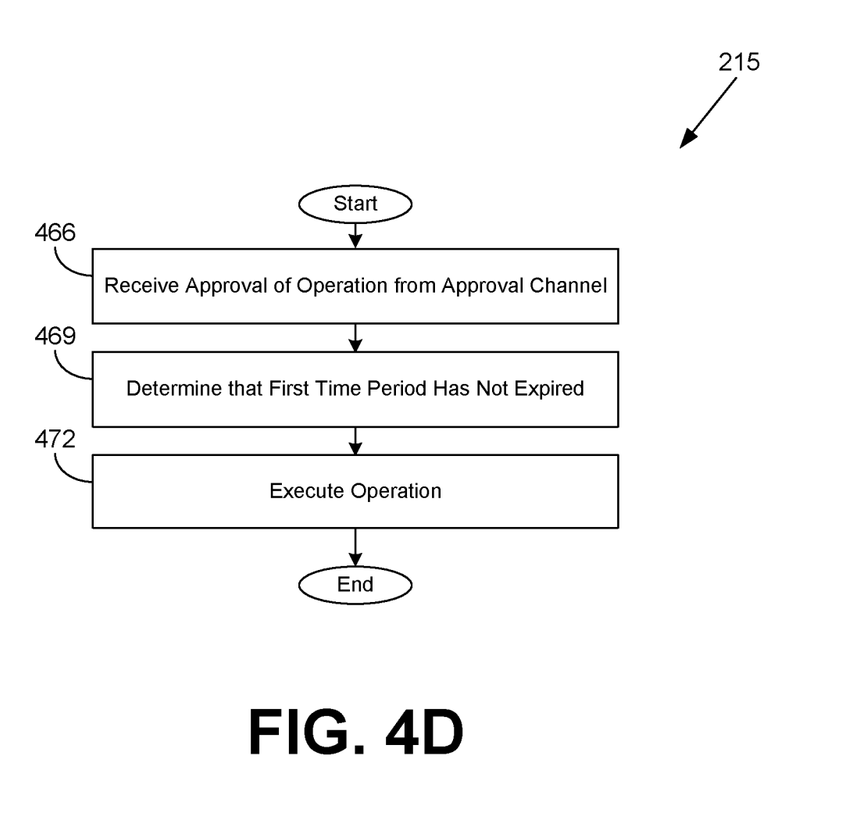

Continuing on to FIG. 4D, in box 466, the account management service 215 receives an approval of a pending operation 239 or revertible operation 242 from a client device 206 that is deemed an approval channel 245 (FIG. 2). For example, a user interface 254 (FIG. 2) may be rendered via the approval channel 245, and the user may select a component that indicates that the operation is to be approved. In box 469, the account management service 215 determines that the first time period has not yet expired. In other words, the operation has not been executed because it is still in the pending state. In box 472, the account management service 215 executes the operation. Thereafter, the operation of the portion of the account management service 215 ends.

Figure 5:
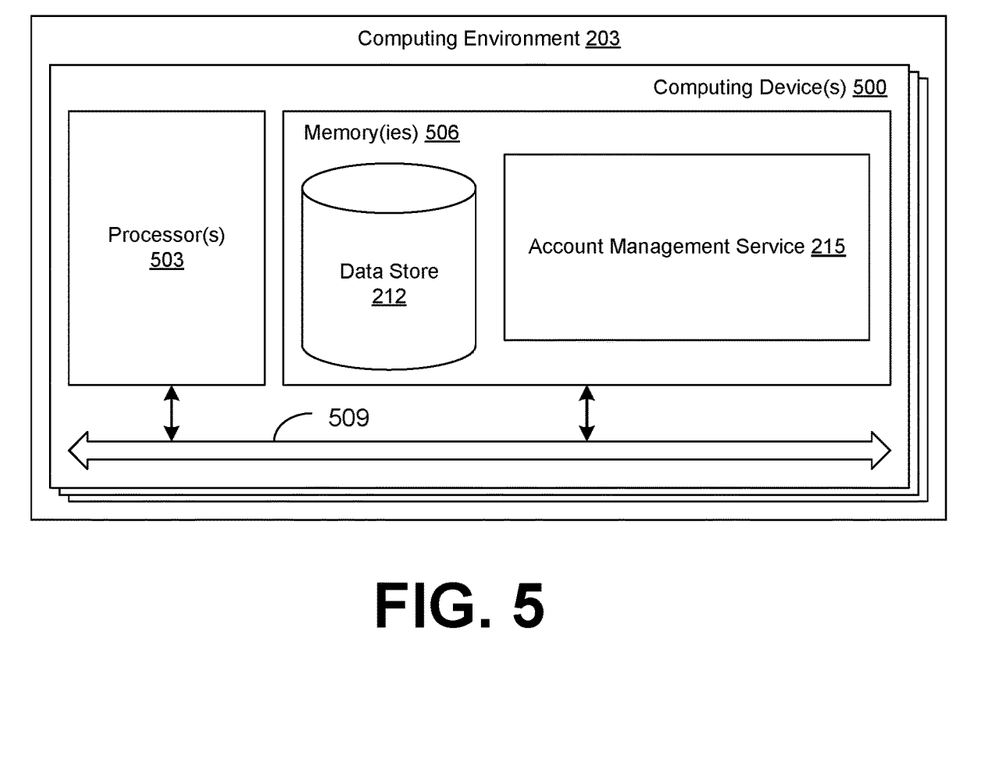
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the account management service 215 and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the account management service 215 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagram 300 (FIG. 3) and the flowcharts of FIGS. 4A-4D show the functionality and operation of an implementation of portions of the account management service 215, the unauthorized client device 207, and the client device 206. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the sequence diagram 300 and the flowcharts of FIGS. 4A-4D show a specific order of execution, it is understood that the order of execution may differ from that which is depicted. For example, the order of execution of two or more blocks may be scrambled relative to the order shown. Also, two or more blocks shown in succession in FIG. 3 and FIGS. 4A-4D may be executed concurrently or with partial concurrence. Further, in some embodiments, one or more of the blocks shown in FIG. 3 and FIGS. 4A-4D may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the account management service 215, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the account management service 215, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one first computing device, wherein when executed the program causes the at least one first computing device to at least:
   authenticate a second computing device for access to a user account;
   receive, from the second computing device, a request to make a modification to one or more configurations of the user account;
   perform a risk assessment that includes determining that the modification would lock an owner of the user account out of accessing the user account;
   determine a first time period based at least in part on the risk assessment, wherein the first time period begins when a notification of the modification is sent to a plurality of communication channels associated with the user account;
   send the notification of the modification to the plurality of communication channels associated with the user account causing the first time period to begin;
   delay making the modification during the first time period;
   make the modification upon expiration of the first time period without receiving a reply to the notification within the first time period; and
   in response to receiving the reply to the notification within the second time period that is after the first time period, revert the modification.

2. The non-transitory computer-readable medium of claim 1, wherein the modification comprises a change to at least one of the plurality of communication channels associated with the user account.

3. The non-transitory computer-readable medium of claim 1, wherein at least one of the plurality of communication channels comprises a third computing device registered to the user account, and the notification comprises a push notification that includes a user interface element configured to cause the reply to be generated when selected.

4. A method, comprising:
   receiving, via at least one of the one or more first computing devices, a modification request from a second computing device that has been authenticated, wherein the modification request comprises a modification to be executed with respect to a user account;
   performing a risk assessment that includes determining that the modification would lock an owner of the user account out of accessing the user account;
   determining a first time period based at least in part on the risk assessment;
   sending, via at least one of the one or more first computing devices, a notification of the modification request through a plurality of communication channels in response to receiving the modification request, the notification facilitating a reply that causes the modification to be cancelled when the reply is sent within a first time period, the first time period beginning with the sending of the notification of the modification;
   performing, via at least one of the one or more first computing devices, the modification in response to an expiration of the first time period without receiving the reply within the first time period;
   receiving, via at least one of the one or more first computing devices, the reply during the second time period; and
   reverting, via at least one of the one or more first computing devices, the modification in response to receiving the reply during the second time period.

5. The method of claim 4, further comprising:
   receiving, via at least one of the one or more first computing devices, an approval of the modification from a third computing device that is registered to the user account; and
   executing, via at least one of the one or more first computing devices, the modification in response to the approval.

6. The method of claim 4, further comprising:
   receiving, via at least one of the one or more first computing devices, the reply; and
   generating, via at least one of the one or more first computing devices, a report including how the second computing device was authenticated.

7. The method of claim 4, further comprising:
   performing, via at least one of the one or more first computing devices, a risk assessment with respect to the modification; and
   determining, via at least one of the one or more first computing devices, a length of the first time period based at least in part on the risk assessment.

8. The method of claim 4, wherein the modification comprises a change affecting authentication for access to the user account.

9. The method of claim 4, wherein the at least one communication channel comprises a plurality of communication channels, and the notification is sent through individual ones of the plurality of communication channels.

10. The method of claim 4, wherein the at least one communication channel is an email address, the notification comprises an email message, and the notification facilitates the reply by at least one of: a link in the email message, or a return email message sent to a sender of the email message.

11. The method of claim 4, wherein the at least one communication channel is a telephone number, the notification comprises a text message, and the notification facilitates the reply by at least one of: a link in the text message, or a return text message sent to a sender of the text message.

12. The method of claim 4, wherein the at least one communication channel is a client device registered to the user account, the notification comprises a graphical user interface, and the notification facilitates the reply by a selectable graphical component in the graphical user interface.

13. The method of claim 4, wherein the at least one communication channel is a voice interface device registered to the user account, the notification comprises a synthesized voice message, and the notification facilitates the reply by a voice reply to the synthesized voice message.

14. A system, comprising:
at least one first computing device comprising memory; and
an account management service executable in the at least one first computing device, wherein when executed the account management service causes the at least one first computing device to at least:
authenticate a second computing device for access to a user account;
receive a modification request from the second computing device, wherein the modification request comprises a modification to one or more configurations of the user account;
perform a risk assessment that includes determining that the modification would lock an owner of the user account out of accessing the user account;
determine a first time period based at least in part on the risk assessment, wherein the first time period begins when a notification of the modification is sent to a plurality of communication channels associated with the user account;
send a notification of the modification request through the plurality of communication channels in response to receiving the modification request and begin the first time period;
cause execution of the modification to be delayed during the first time period;
perform the modification after expiration of the first time period without receiving a reply to the notification within the first time period; and
in response to receiving the reply to the notification within a second time period following the performance of the modification, revert the modification.

15. The system of claim 14, wherein the reply indicates that the modification is unauthorized by an owner of the user account.

16. The system of claim 14, wherein when executed the account management service further causes the at least one first computing device to at least generate a report indicating information about the second computing device in response to receiving the reply.

17. The system of claim 14, wherein when executed the account management service further causes the at least one first computing device to at least determine a length of the first time period based at least in part on a risk assessment of the modification.

18. The system of claim 14, wherein the modification comprises a change affecting a receipt of payments for the user account.

19. The non-transitory computer-readable medium of claim 1, wherein at least one communication channel in the plurality of communication channels is a telephone number, the notification comprises a text message, and the notification facilitates the reply by at least one of: a link in the text message, or a return text message sent to a sender of the text message.

20. The non-transitory computer-readable medium of claim 1, wherein at least one communication channel in the plurality of communication channels is a client device registered to the user account, the notification comprises a graphical user interface, and the notification facilitates the reply by a selectable graphical component in the graphical user interface.

* * * * *